(12) United States Patent
Takikawa et al.

(10) Patent No.: US 7,595,962 B2
(45) Date of Patent: Sep. 29, 2009

(54) HEAD SUSPENSION HAVING RIGID PART RAIL DIMINISHED AT LONGITUDINAL CURVE

(75) Inventors: Kenichi Takikawa, Aikoh-gun (JP); Masao Hanya, Yokohama (JP); Noriyuki Saito, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 358 days.

(21) Appl. No.: 11/384,092

(22) Filed: Mar. 17, 2006

(65) Prior Publication Data

US 2006/0209465 A1    Sep. 21, 2006

(30) Foreign Application Priority Data

Mar. 17, 2005    (JP) .............................. 2005-076532

(51) Int. Cl.
G11B 5/55    (2006.01)
(52) U.S. Cl. ................................. 360/244.9
(58) Field of Classification Search ............. 360/245.2, 360/244.8–244.9
See application file for complete search history.

(56) References Cited

U.S. PATENT DOCUMENTS

| | | | |
|---|---|---|---|
| 5,282,103 A | 1/1994 | Hatch et al. | |
| 5,870,252 A | 2/1999 | Hanrahan | |
| 6,104,572 A * | 8/2000 | Williams et al. | 360/244.9 |
| 6,154,344 A | 11/2000 | Marek | |
| 6,392,843 B1 * | 5/2002 | Murphy | 360/245.3 |
| 6,728,072 B1 | 4/2004 | Van Sloun et al. | |
| 6,765,759 B2 | 7/2004 | Bhattacharya et al. | |
| 7,283,332 B2 * | 10/2007 | Weber | 360/245.5 |
| 2001/0043443 A1 * | 11/2001 | Okamoto et al. | 360/294 |
| 2006/0260118 A1 | 11/2006 | Takikawa et al. | |

FOREIGN PATENT DOCUMENTS

| | | |
|---|---|---|
| JP | 59-120325 | 7/1984 |
| JP | 59-202119 | 11/1984 |
| JP | 9-282624 | 10/1997 |
| JP | 2000-137967 | 5/2000 |
| JP | 2005-032393 | 2/2005 |

* cited by examiner

*Primary Examiner*—A. J. Heinz
(74) *Attorney, Agent, or Firm*—Jordan and Hamburg LLP

(57) ABSTRACT

The head suspension includes a base plate turned around a spindle, a load beam, and a flexure. The load beam includes the rigid part, a resilient part, and a head. A base end of the rigid part is attached to the resilient part, which is supported with the base plate. The head is for writing and reading data to and from a disk and is positioned at a front end of the rigid part to receive load from the load beam. The flexure is attached to the load beam and supports the head. A rail is formed along each side edge of the rigid part by bending the side edge in a thickness direction of the rigid part. The rail is continuous from the front end to the base end of the rigid part. The base end of the rigid part widens to form a wide part. The rail has a longitudinal curve around the start of the wide part. The longitudinal curve is provided with a deformable part that is more easily deformable in the longitudinal and vertical directions of the rail than the remaining parts.

18 Claims, 13 Drawing Sheets

| リフトオフの有無 | Static G lift off 506.1G/3gf | | Static G lift off 506.1G/3gf | |
|---|---|---|---|---|
| | Loadbeam B1:3.11kHz (Short Rail Loadbeam) | | Loadbeam B1:4.02kHz (Long Rail Loadbeam) | |
| | 0.4msec | 1msec | 0.4msec | 1msec |
| No lift off | 273G | 257G 292G | 273G 301G | 273G 302G |
| Lift off at Leading side | (296G) | → | (325G) | 327G |
| Lift off | 324G | 327G | 351G | 354G |

Suspension B1:3.6kHz

Suspension B1:3.1kHz

HEAD SUSPENSION HAVING RIGID PART RAIL DIMINISHED AT LONGITUDINAL CURVE

BACKGROUND OF THE INVENTION

1. Field of the Invention

The present invention relates to a head suspension of a hard disk drive incorporated in an information processor such as a personal computer.

2. Description of Related Art

A head suspension of a hard disk drive includes a load beam, a head supported with the load beam, and a slider attached to the head. The head suspension has a shock property that determines a lift of the slider from the surface of a hard disk when a shock is applied. The shock property of the head suspension is dependent on the weight of the load beam.

For example, a first head suspension has a load beam having a thickness (t) of 51 μm, a length (lL) of 7 mm, and a gram load of 2.5 gf that is applied by the load beam to a head, and a second head suspension has a load beam having a thickness (t) of 30 μm, a length (lL) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

It is understood from these examples that, to improve the shock property of a head suspension, a load beam of the head suspension must be thin and short and must have a large gram load.

FIG. 14 is a plan view showing a head suspension 101 for a hard disk drive according to a related art. The head suspension 101 has a base plate 103, a load beam 105, and a flexure 107. The load beam 105 has a rigid part (stiff part) 109 and a resilient part (hinge) 111. Each side edge of the rigid part 109 is provided with a rail 113 that rises from the surface of the rigid part 109.

FIG. 15 is a sectional view partly showing a hard disk drive in which the head suspension of FIG. 14 is installed. A carriage 115 has arms 117. To one of the arms 117, the base plate 103 of the head suspension 101 is fixed by, for example, swaging.

The carriage 115 is turned around a spindle 119 by a positioning motor 118 such as a voice-coil motor. The carriage 115 is turned around the spindle 119, to move a head 121 of the head suspension 101 to a target track on a hard disk 123.

When the disks 123 are rotated at high speed, the head 121 slightly rises from the surface of the disk 123 against the gram load of the head suspension 101.

To improve the shock property of the head suspension 101, the length (lL) of the load beam 105 is shortened and thinned, thereby reducing the weight of the load beam 105.

In practice, the arm 117 vibrates. Accordingly, the load beam 105 must be designed in consideration of the first bending frequency of the arm 117, i.e., the resonant frequency of the arm 117 in a first bending mode. The first bending frequency is hereinafter referred to as the "B1 frequency." It is important to consider the B1 frequency of the arm 117 when determining a B1 frequency for the load beam 105.

FIGS. 16 to 18 are graphs showing a relationship between the B1 frequency and shock property of an arm installed in a 2.5-inch hard disk drive. Among the figures, FIG. 16 shows an acceleration representative of a shock applied to the hard disk drive at which a slider lifts, FIG. 17 shows a maximum acceleration occurring at a front end of the arm due to the applied shock, and FIG. 18 shows a maximum displacement of the arm due to the applied shock. In each of FIGS. 16 to 18, an abscissa indicates the B1 frequency of the arm. In each of FIGS. 16 and 17, an ordinate indicates an acceleration on the arm. In FIG. 18, an ordinate indicates a displacement of the arm. The magnitude of acceleration of the applied shock is 300 G in each case. Half-wavelength durations of the applied shock are 2 msec, 1 msec, and 0.4 msec.

It is understood in FIGS. 16 to 18 that the arm is substantially immovable against a shock of 2 msec or 1 msec duration if the B1 frequency of the arm is high (for example, 1.5 kHz) as indicated with curves 125A, 125B, 125C, 127A, 127B, and 127C. On the other hand, the arm differently acts against a shock of 0.4 msec duration, as indicated with curves 129A, 129B, and 129C.

This is because the arm conducts a large action with respect to a shock of 0.4 msec duration even if the B1 frequency of the arm is high.

A head suspension attached to such an arm must follow the arm action. If the load beam of a head suspension can follow the vibration of an arm, the slider of the head suspension will not lift from the surface of a disk.

Another consideration to be done for a head suspension is an off-track property. It is basically understood that the vertical rigidity (or stiffness) of a head suspension is irrelevant to the off-track property of the head suspension.

In practice, head suspensions involve a slight twist, and disks involve a slight inclination. Due to such twist and inclination, the vertical rigidity or B1 frequency of a head suspension influences the off-track property of the head suspension.

FIG. 19 is a graph showing the off-track property of a head suspension whose B1 frequency is 3.1 kHz. In FIG. 19, an abscissa indicates the frequency of an arm and an ordinate indicates off-track displacement. In the graph of FIG. 19, a curve depicted with a continuous line represents the off-track property of a head suspension measured on a 2.5-inch disk rotated at 5400 rpm and a curve depicted with a dotted line represents the off-track property of the head suspension measured on a 2.5-inch disk rotated at 7200 rpm.

In FIG. 19, the head suspension has a low B1 frequency of 3.1 kHz, and therefore, the bending mode of the head suspension overlaps the bending mode of the arm. As a result, an off-track phenomenon is observed at 3.0 kHz and at 3.3 kHz.

To avoid the off-track phenomenon, the B1 frequency of the load beam of the head suspension must be increased so that the bending mode of the head suspension will not overlap the bending mode of the arm.

To increase the B1 frequency of a load beam, continuously forming the rail 113 along each side edge of the rigid part 109 as shown in FIG. 14 is effective.

For a load beam having a configuration shown in FIG. 20, it is difficult to form a continuous rail along the whole length of a rigid part 109A.

FIG. 20 is a perspective view showing a head suspension. Parts of FIG. 20 corresponding to those of FIG. 14 are represented with the same reference numerals plus "A."

To improve the vertical rigidity (stiffness) of the load beam 105A, the head suspension 101A of FIG. 20 has rails 113A on the rigid part 109A of the load beam 105A. A base end of the rigid part 109A has a wide part 131. The wide part 131 has a trapezoidal shape that gradually widens toward a resilient part 111A. The wide part 131 has no rails.

The head suspension 101A of FIG. 20 is used for a 3.5-inch hard disk that has little demand for an improved shock property but has a more intense need for a high sway frequency. To achieve a higher sway frequency, the rigid part 109A is provided with the wide part 131. It is not strongly required for this head suspension to extend the rails 113A over the wide part 131.

A head suspension used for a 2.5-inch disk drive is required to have an improved shock property. The structure of FIG. 20 having no rails on the wide part 131 demonstrates a low B1 frequency for the load beam 105A, to hardly satisfy the required shock property.

To satisfy the required shock property, a structure shown in FIG. 21 may be devised from the structure of FIG. 20. FIG. 21 is a perspective view showing a head suspension 101B. Parts of FIG. 21 that correspond to those of FIG. 20 are represented with the same reference numerals plus "B" instead of "A."

The head suspension 101B of FIG. 21 continuously forms rails 113B from the front end of a rigid part 109B to the end of a wide part 131B. This configuration can improve the B1 frequency of a load beam 105B to satisfy a required shock property and improve a sway frequency.

Continuously forming the rails 113B from the front end of the rigid part 109B to the end of the wide part 131B involves a longitudinal curve 133 at an intermediate part of each rail 113B. When forming the rail 113B by bending the rigid part 109B including the wide part 131B, the rail 113B may be deformed at the longitudinal curve 133, to twist the rigid part 109B. The twist of the rigid part 109B deteriorates the off-track property of the head suspension 101B.

For the details of the above-mentioned related arts, U.S. Patent Publication No. 6765759B2 and Japanese Unexamined Patent Application Publication No. Hei-9-282624 can be referred to.

SUMMARY OF THE INVENTION

An object of the present invention is to provide a head suspension having a load beam and rails formed on the load beam, capable of achieving a required shock property and solving the problem of a twist of the head suspension due to longitudinal curves of the rails.

In order to accomplish the object, an aspect of the present invention provides a head suspension for a hard disk drive, having a load beam including a resilient part and a rigid part on which rails are formed. Each rail has a deformable part at a longitudinal curve of the rail. The deformable part is easily deformable in longitudinal and vertical directions of the rail, to prevent a twist of the head suspension even with the presence of the longitudinal curves in the rails.

According to this aspect of the present invention, the longitudinal curve of each rail is provided with the deformable part that is easily deformable in longitudinal and vertical directions of the rail compared with the other parts of the rail. The rails with the deformable parts can improve the vertical rigidity (stiffness) of the load beam, increase the B1 frequency of the load beam, and satisfy shock and off-track properties required for the head suspension.

DETAILED DESCRIPTION OF EMBODIMENTS

The head suspension of the present invention satisfies a required shock property by providing the resilient part of the load beam with the rails and prevents a twist of the head suspension due to the presence of the longitudinal curves of the rails by providing the rails with the deformable parts.

Figure 1:
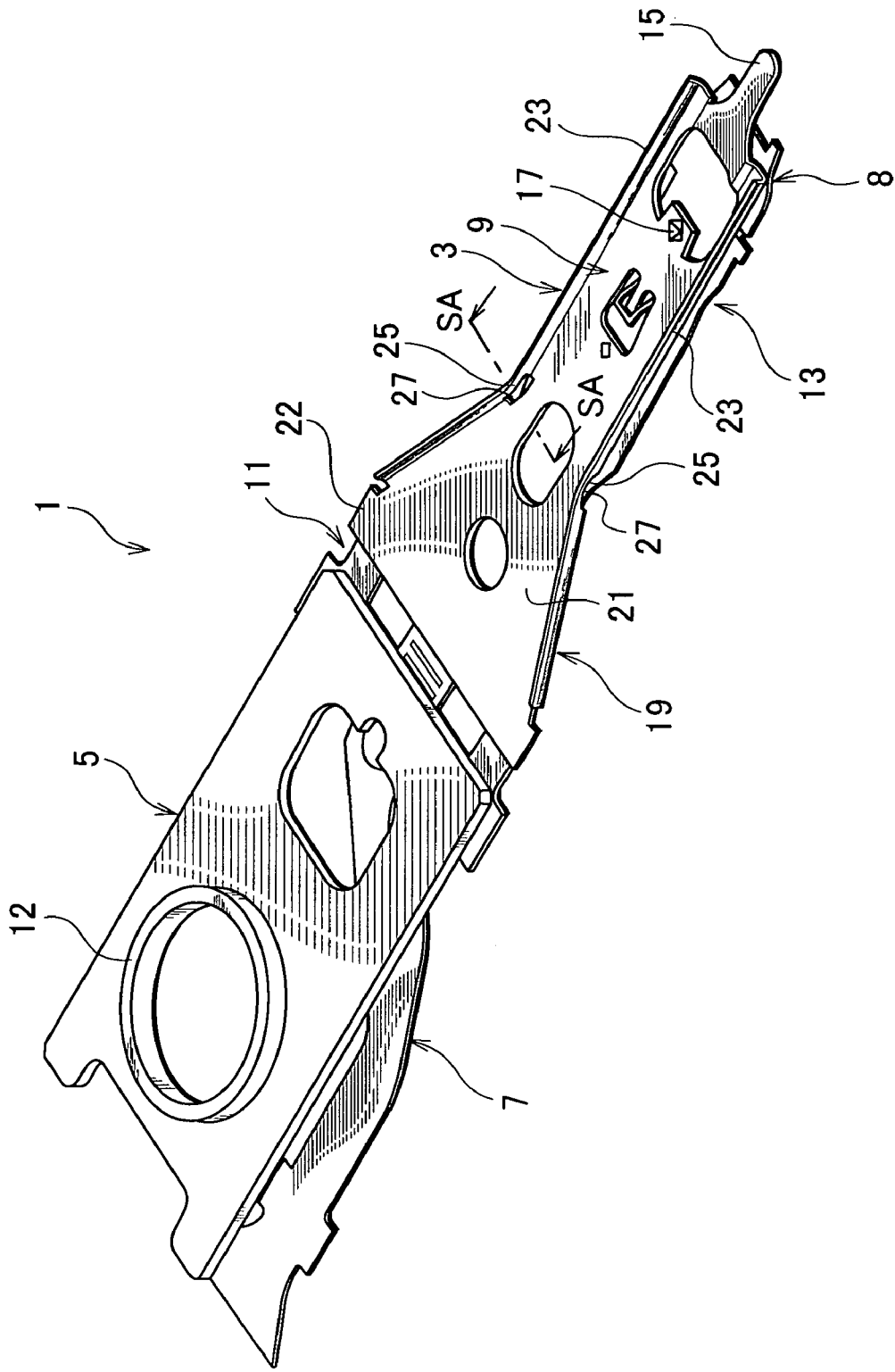
FIG. 1 is a perspective view showing a head suspension according to a first embodiment of the present invention.
Figure 2A:
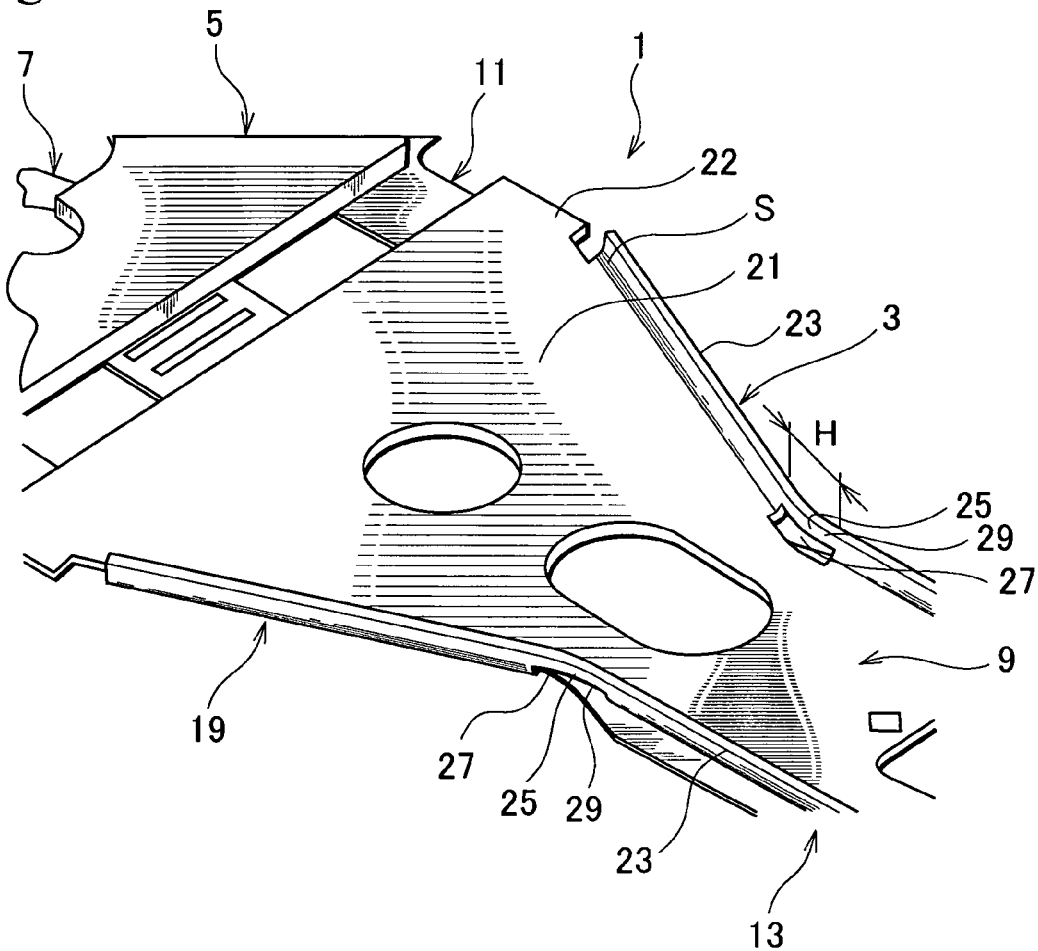
FIG. 2A is an enlarged perspective view partly showing the head suspension of FIG. 1.
Figure 2B:
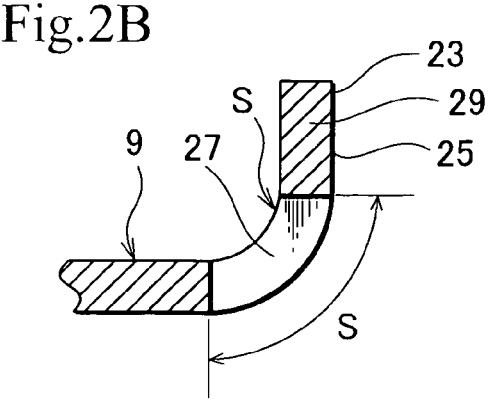
FIG. 2B is a sectional view taken along a line II-II of FIG. 1.
Figure 2C:
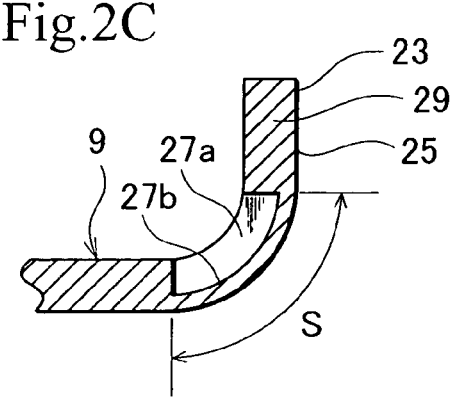
FIG. 2C is a sectional view showing a modification of the first embodiment, the part shown in FIG. 2C corresponding to the part shown in FIG. 2B.
Figure 3:
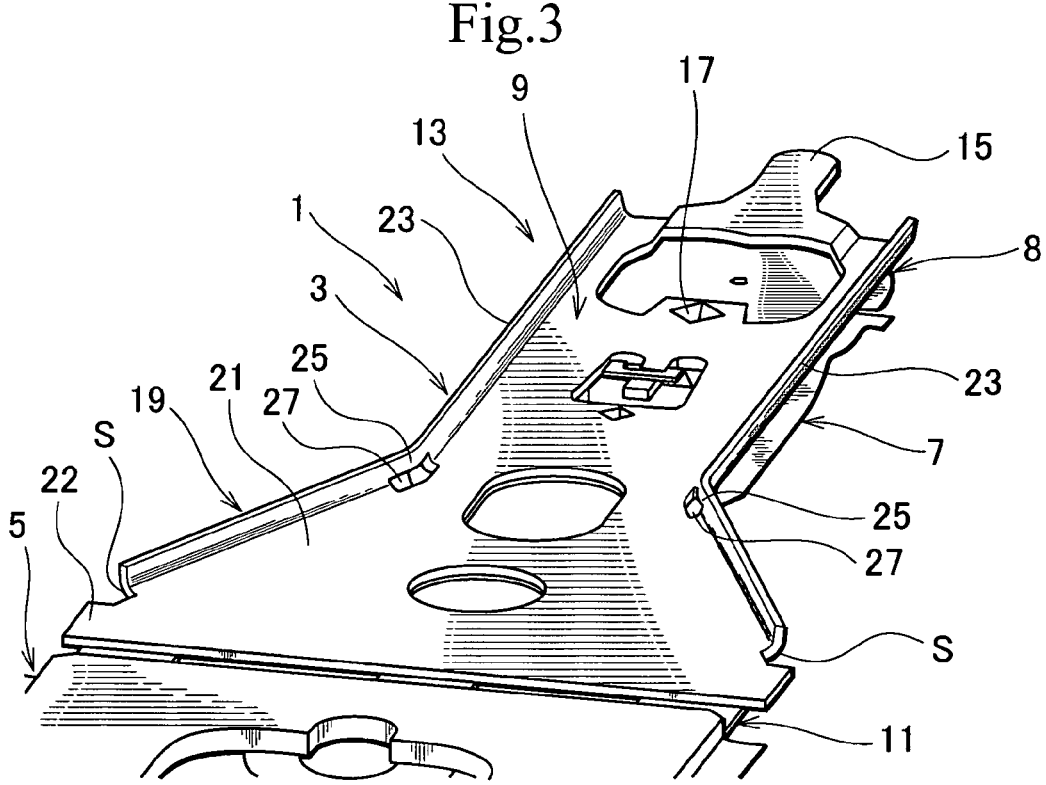
FIG. 3 is a different view showing the head suspension of the first embodiment.

A head suspension according to a first embodiment of the present invention will be explained with reference to FIGS. 1 to 3 in which FIG. 1 is a perspective view showing the head suspension, FIG. 2A is an enlarged perspective view partly showing the head suspension, FIG. 2B is a sectional view taken along a line II-II of FIG. 1, FIG. 2C is a sectional view showing a modification of the first embodiment, and FIG. 3 is a different view showing the head suspension according to the first embodiment.

The head suspension 1 shown in FIGS. 1 to 3 is used for a 2.5-inch disk, for example, and has a load beam (LB) 3, a base plate 5, and a flexure 7.

The load beam 3 applies load onto a head 8. The head 8 is arranged at a front end of the load beam 3, to write and read data to and from the disk. The load beam 3 includes a rigid part (or stiff part) 9 and a resilient part (or hinge) 11. The rigid part 9 is made of, for example, stainless steel and has a thickness of, for example, about 30 μm.

The resilient part 11 is prepared separately from the rigid part 9. The resilient part 11 is made of, for example, a thin resilient rolled stainless-steel plate. A first end of the resilient part 11 is fixed to a base end 19 of the rigid part 9 by, for example, laser welding, and a second end of the resilient part 11 is fixed to the base plate 5 by, for example, laser welding.

The base plate 5 has a boss 12. The boss 12 is attached by swaging to an arm of a carriage installed in a hard disk drive, so that the base plate may turn around a spindle. The base plate 5 may be integral with an arm that is attached to the carriage.

The flexure 7 includes a conductive thin plate made of, for example, a resilient stainless-steel rolled plate (SST). On the thin plate, an insulating layer is formed. On the insulating layer, wiring patterns are formed. The flexure 7 is fixed to the rigid part 9 by, for example, laser welding. One ends of the wiring patterns are electrically connected to write and read terminals supported on a slider of the head 8. The other ends of the wiring patterns are extended along the base plate 5.

The rigid part 9 has a front end 13 that is narrow and has a predetermined width. The front end 13 is provided with a load/unload tab 15 and a dimple 17. The base end 19 of the rigid part 9 is provided with a wide part 21 that gradually widens toward the resilient part 11. For example, the wide part 21 has a trapezoidal plan shape. An end of the wide part 21 is a joint 22 that is connected to the resilient part 11. At this joint 22, the rigid part 9 is joined to the resilient part 11.

A rail 23 is formed along each side edge of the rigid part 9 by bending the side edge so that the rail 23 rises in a thickness direction of the rigid part 9. The rail 23 continuously and entirely extends on the front end 13 of the rigid part 9 and on the wide part 21 of the base end 19 of the rigid part 9. The thickness of the rail 23 is the same as the general thickness of the rigid part 9 adjacent to the rail 23 in a direction intersect with a rail extending direction (longitudinal direction).

Each rail 23 has a longitudinal curve 25 at a portion corresponding to a portion of rigid part 9 between the front end 13 and the base end 19. The longitudinal curve 25 is spread across an area of rail 23 corresponding to an area of the rigid part 9 between back and front positions of where the width of the front end 13 starts to widen to form the wide part 21. At the longitudinal curve 25, the rail 23 has a rectangular window 27, i.e., a through hole serving as a deformable part. Namely, the deformable part is formed by partly removing at least a material of the rail 23.

As shown in FIGS. 2A and 2B, the longitudinal curve 25 extends for a longitudinal distance H. A vertical curve S is formed between the rigid part 9 and each rail 23 in a rising direction of the rail 23. The vertical curve S extends for a distance S in the rising direction of the rail 23. At the longitudinal curve 25, the window 27 spans substantially for the distances H and S. Namely, at the longitudinal curve 25, the rail 23 is partially cut by the window 27. According to the present embodiment, the rigid part 9 is also partially cut by the window 27. The window 27 may spread more than the distances H and S, or less than them. At the longitudinal curve 25, the rail 23 is continuous with a bridge 29.

With the window 27, the longitudinal curve 25 of the rail 23 is easily deformable in the longitudinal and rising directions of the rail 23 compared with the remaining part of the rail 23. When forming the rail 23 by bending the side edge of the rigid part 9, the window 27 releases or relaxes stress acting on the rigid part 9 and longitudinal curve 25.

The deformable part may be configured as shown in FIG. 2C. In FIG. 2C, the deformable part at the longitudinal curve 25 includes a recess 27a and a thin part 27b defined by the recess 27a. The area of the recess 27a and thin part 27b may be equal to that of the window 27. The thin part 27b may be located at an inner, outer, or intermediate position in the thickness direction of the vertical curve S.

Figure 4:
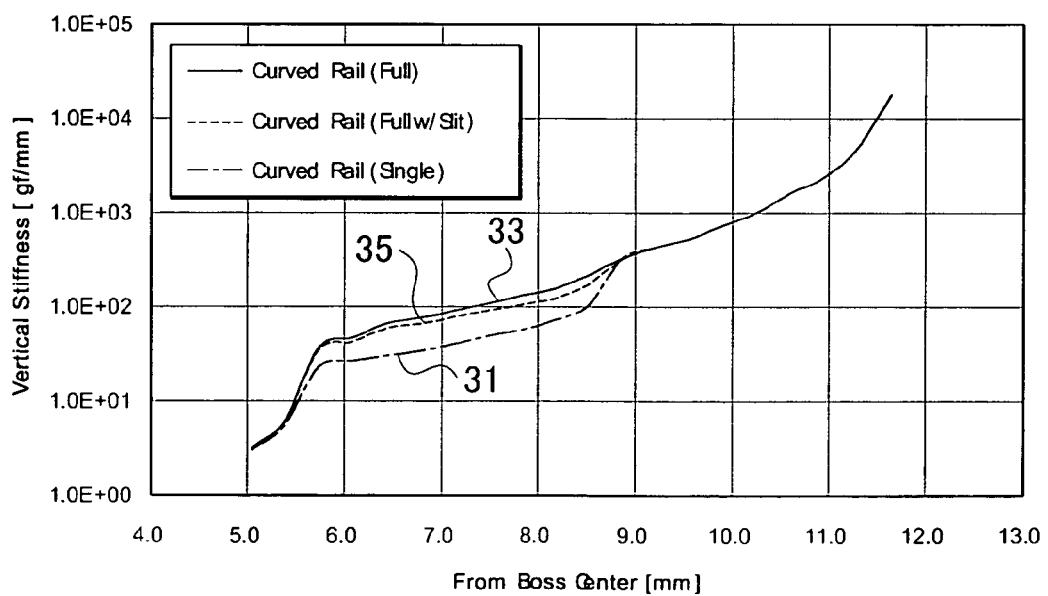
FIG. 4 is a graph showing a distribution of vertical rigidity (stiffness) of the head suspension of the first embodiment.

FIG. 4 is a graph showing a distribution of vertical rigidity (stiffness) of the head suspension 1. An abscissa indicates a distance from the center of the boss 12 and an ordinate indicates vertical rigidity.

Figure 20:
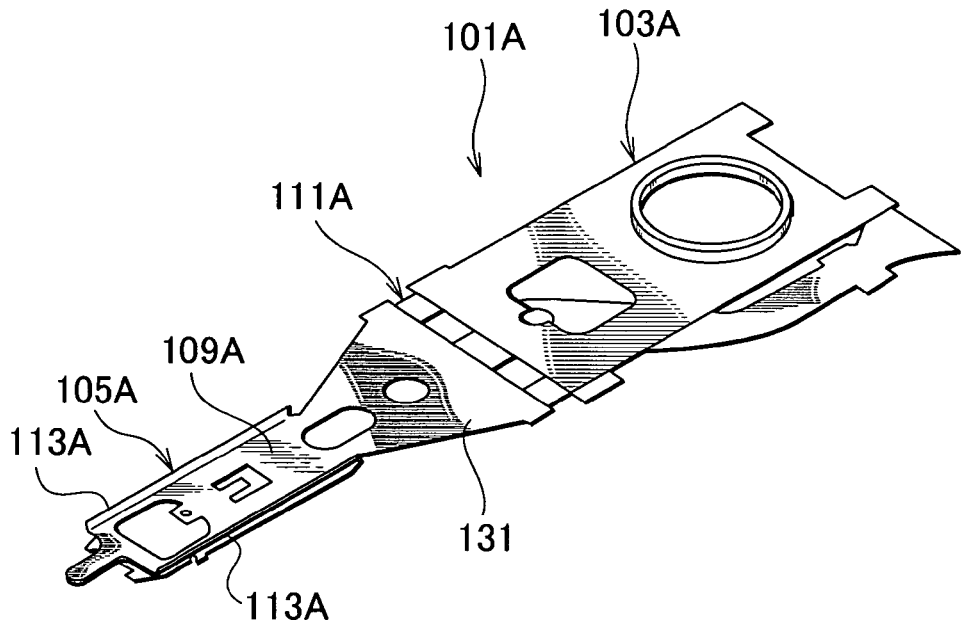
FIG. 20 is a perspective view showing a head suspension according to a related art.
Figure 21:
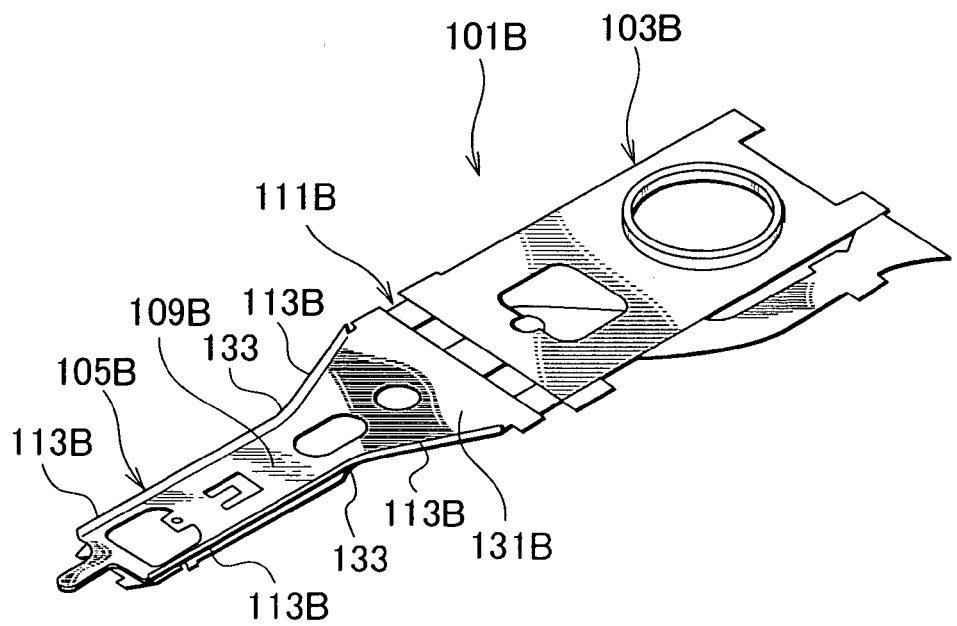
FIG. 21 is a perspective view showing a head suspension according to a related art.

In FIG. 4, a curve 31 represents the head suspension 101A of the related art shown in FIG. 20 having the rails 113A formed only along the front end of the rigid part 109A. A curve 33 represents the head suspension 101B of the related art shown in FIG. 21 having the rails 113B that continue along the front end and wide part 131B of the rigid part 109B without deformable parts on the rails 113B. A curve 35 represents the head suspension 1 according to the first embodiment of the present invention.

As is apparent in FIG. 4, the head suspension 101B (FIG. 21) having the rails extending along the front end and wide part 131B of the rigid part 109B and the head suspension 1 according to the first embodiment each demonstrate higher vertical rigidity than the head suspension 101A (FIG. 20) having the rails 113A only along the front end of the rigid part 109A. Compared with the head suspension 101B having no deformable parts on the rails 113B that are continuous along the front end and wide part 131B of the rigid part 109B, the head suspension 1 of the first embodiment having the windows 27 serving as deformable parts on the rails 23 demonstrates nearly the same vertical rigidity.

An analysis of characteristics or properties that are required for a load beam to follow the motion of an arm will be explained.

Figure 5:
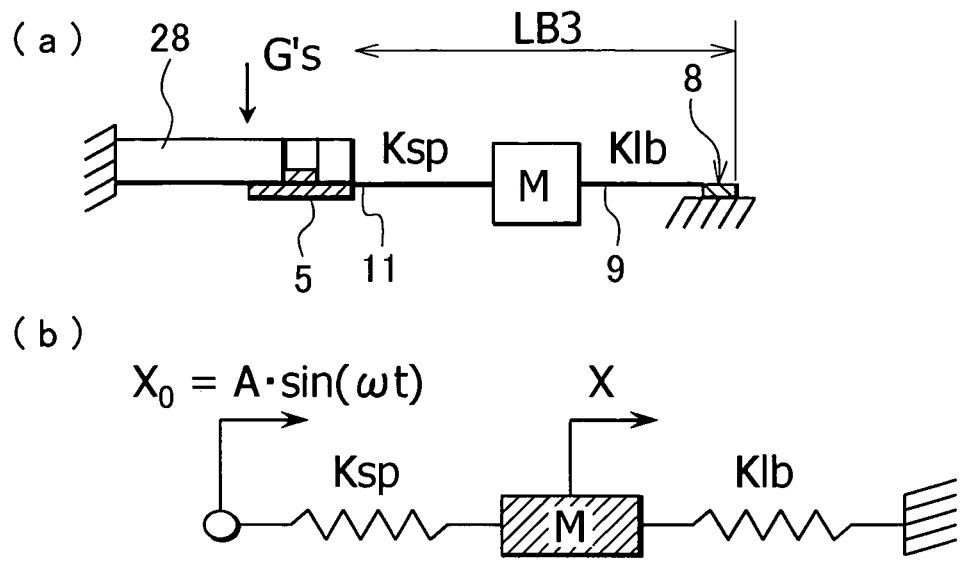
FIG. 5A is an analytic model showing a head suspension.
FIG. 5B is a vibration model based on the model of FIG. 5A.

FIG. 5A is an analytic model showing a head suspension and FIG. 5B is a vibration model based on the model of FIG. 5A. In FIGS. 5A and 5B, M is a mass of the load beam 3 assumed to be concentrated on the gravity center, Ksp is a spring constant of the load beam 3 on a resilient part 11 side from the gravity center, including the resilient part 11 that is supported with an arm 28, Klb is a spring constant due to the rigidity of a rigid part 9 from the gravity center to a dimple, G's is a shock input, X0 is an arm action, and X is a displacement of the load beam 3 at the gravity center.

The displacement X is expressed as follows:

$$X = A / \{(Klb/Ksp) - (\omega/\omega 0)^2 + \omega 0^2\} \quad (1)$$

$$\omega 0^2 = Ksp/M$$

Figure 6:
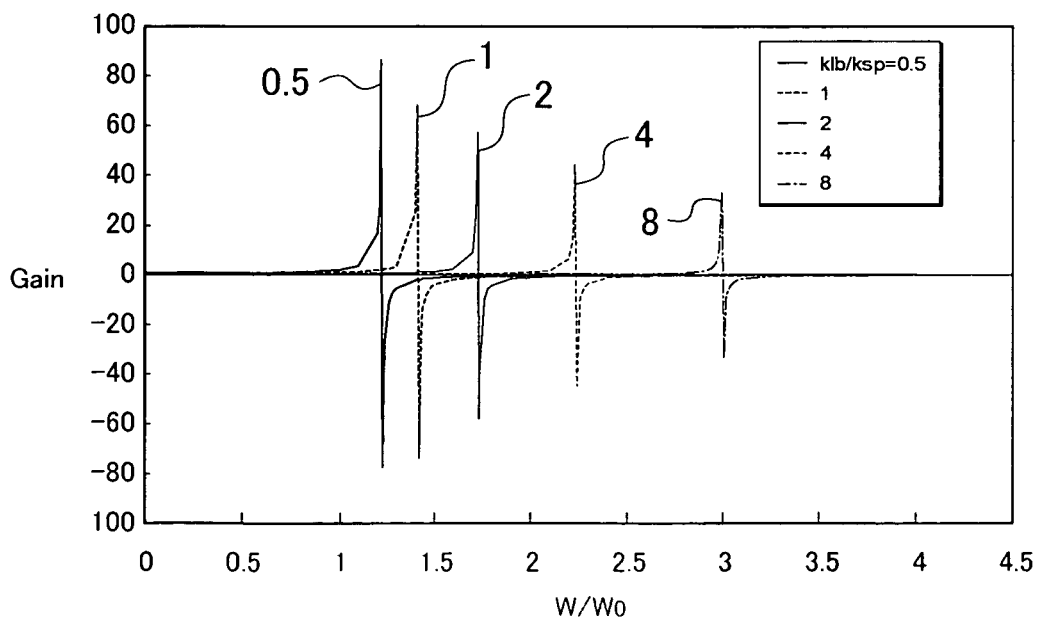
FIG. 6 is a graph showing a relationship between an increase in "Klb/Ksp" and a gain based on the models of FIGS. 5A and 5B.

Reducing the displacement X results in suppressing a lift of a slider from a disk. For this, the expression (1) indicates that (Klb/Ksp) and $\omega 0^2$ must be increased. FIG. 6 is a graph showing a relationship between an increase in (Klb/Ksp) and a gain. When (Klb/Ksp) is increased as 0.5, 1, 2, 4, and 8 as shown in FIG. 6, the frequency increases and the gain decreases.

To increase (Klb/Ksp), Klb must be increased because Ksp is restricted by the resilient part 11. Namely, the vertical stiffness (rigidity) of the load beam must be improved. To increase $\omega 0^2$, M must be reduced.

In consequence, to reduce the displacement X, the vertical stiffness of the load beam must be improved and the mass M must be reduced.

Figures 7, 8:
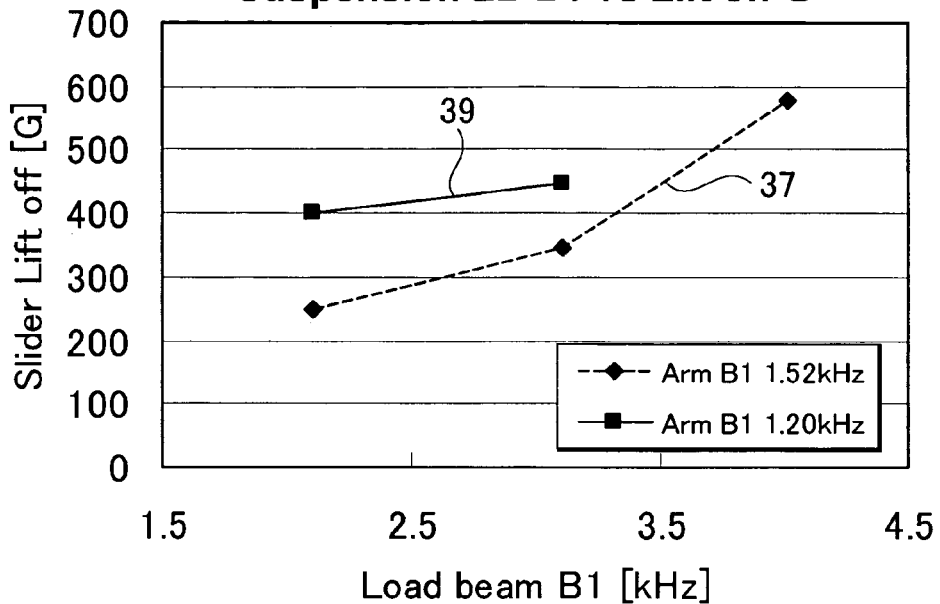
FIG. 7 is a graph showing a relationship among the B1 frequency of an arm, the B1 frequency of a load beam, and the lift-off of a slider.
FIG. 8 is a list showing a relationship among the lift-off of a slider, the magnitude of a shock applied, and the B1 frequency of a head suspension that supports the slider in connection with a 2.5-inch hard disk drive.

FIG. 7 is a graph showing a relationship among the B1 frequency of an arm, the B1 frequency of a load beam, and the lift-off of a slider. An abscissa represents the B1 frequency of a load beam and an ordinate represents the acceleration of a shock at which a slider of the load beam lifts. A curve 37 is for an arm having a B1 frequency of 1.52 kHz and a curve 39 is for an arm having a B1 frequency of 1.20 kHz.

As is apparent in FIG. 7, a load beam having a low B1 frequency is unable to follow the arm having the high B1 frequency, demonstrates an inferior shock property, and causes the slider thereof to lift at a low acceleration. A load beam having a B1 frequency of 4 kHz can sufficiently follow the arm having the high B1 frequency of 1.52 kHz, demonstrates a superior shock property, and realizes a high acceleration level at which the slider thereof lifts.

Data shown in FIG. 7 relates to assemblies each consisting of only a carriage arm and a head suspension. In practice, situations surrounding the head suspension are more complicated because many conditions such as the behavior of a head suspension base and the operation mode of a disk are involved. FIG. 8 shows data sampled from head suspensions in more practical situations.

FIG. 8 is a list showing a relationship among the lift-off of a slider, the magnitude of a shock applied, and the B1 frequency of a head suspension that supports the slider. The data shown in FIG. 8 relates to a 2.5-inch hard disk drive. When the B1 frequency of a load beam is increased from 3.11 kHz to 4.02 kHz as shown in FIG. 8, the level of a shock of 0.4 msec duration at which the slider of the load beam lifts increases from 296 G to 325 G. In this way, increasing the B1 frequency of a load beam is effective to suppress a lift-off of the slider of the load beam.

Figure 9:
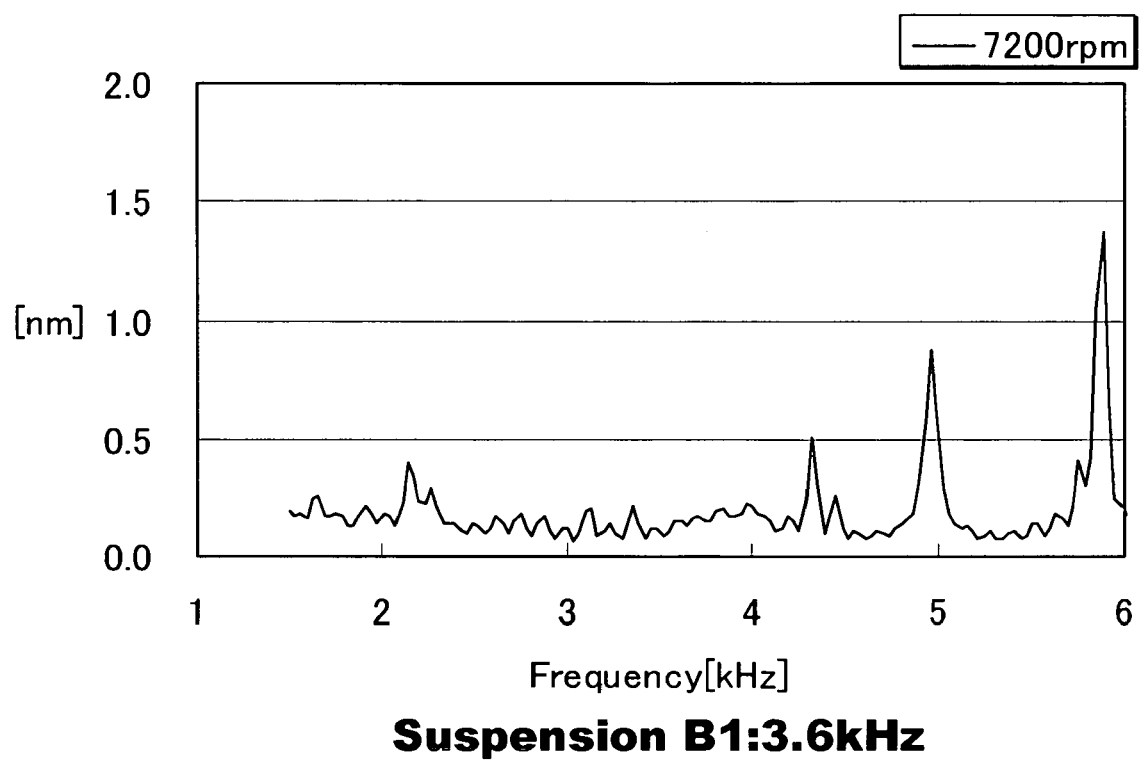
FIG. 9 is a graph showing the off-track property of a head suspension, including an arm, which has a total B1 frequency of 3.6 kHz.

FIG. 9 is a graph showing the off-track property of a head suspension having a total B1 frequency of 3.6 kHz. An abscissa represents frequencies and an ordinate represents off-track amount. The data shown in FIG. 9 relates to a 2.5-inch hard disk rotating at 7200 rpm.

Figure 19:
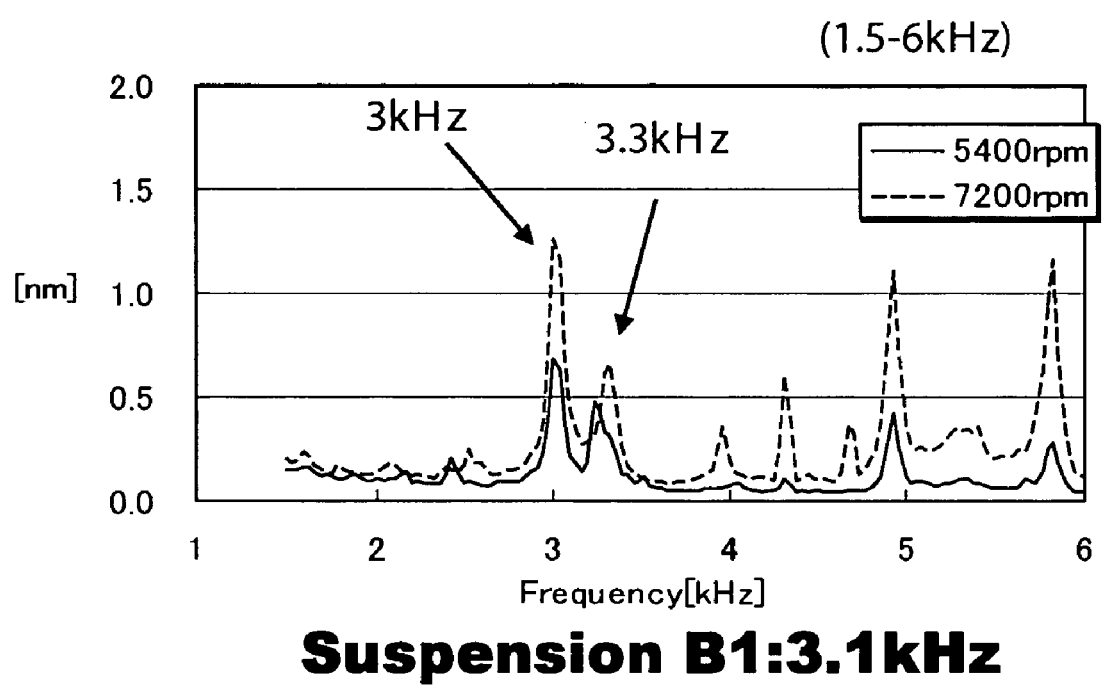
FIG. 19 is a graph showing the off-track property of a head suspension having a total B1 frequency of 3.1 kHz according to a related art.

As explained with reference to FIG. 19, a head suspension having a low B1 frequency overlaps the bending mode of the head suspension on the bending mode of an arm, to cause an off-track error.

The first embodiment improves the vertical stiffness (rigidity) of the load beam 3, to increase the B1 frequency of the head suspension 1. This results in eliminating the overlapping of the bending modes of the head suspension 1 and an arm and reducing a bending amplitude. It is apparent from comparison between the first embodiment of FIG. 9 and the related art of FIG. 19 that the first embodiment causes no off-track error related to the bending mode of the head suspension 1.

As explained above, the head suspension according to the first embodiment of the present invention has the window 27 at the longitudinal curve 25 of each rail 23. The window 27 prevents a distortion of the rigid part 9 and rail 23 when forming the rail 23 by bending a side edge of the rigid part 9. The rails 23 can improve the vertical rigidity of the load beam 3, increase the B1 frequency of the load beam 3, and satisfy a shock property required for the head suspension 1. The wide part 21 of the rigid part 9 can increase a sway frequency. The wide part 21 has the rails 23 that are continuous from the front end 13 of the rigid part 9, to further increase the sway frequency.

The window 27 covers the longitudinal distance H and vertical distance S of the longitudinal curve 25 of each rail 23. With the window 27, the longitudinal curve 25 of the rail 23 is easily deformable in the longitudinal and rising directions of the rail 23 compared with the remaining part of the rail 23. When forming the rail 23 by bending a side edge of the rigid part 9, the window 27 releases or relaxes stress acting on the rigid part 9 and longitudinal curve 25. This configuration prevents a distortion of the rigid part 9 at the longitudinal curve 25 when forming the rail 23 by bending a side edge of the rigid part 9, suppresses a torsion of the head suspension 1, and eliminates an off-track error.

Figure 10:
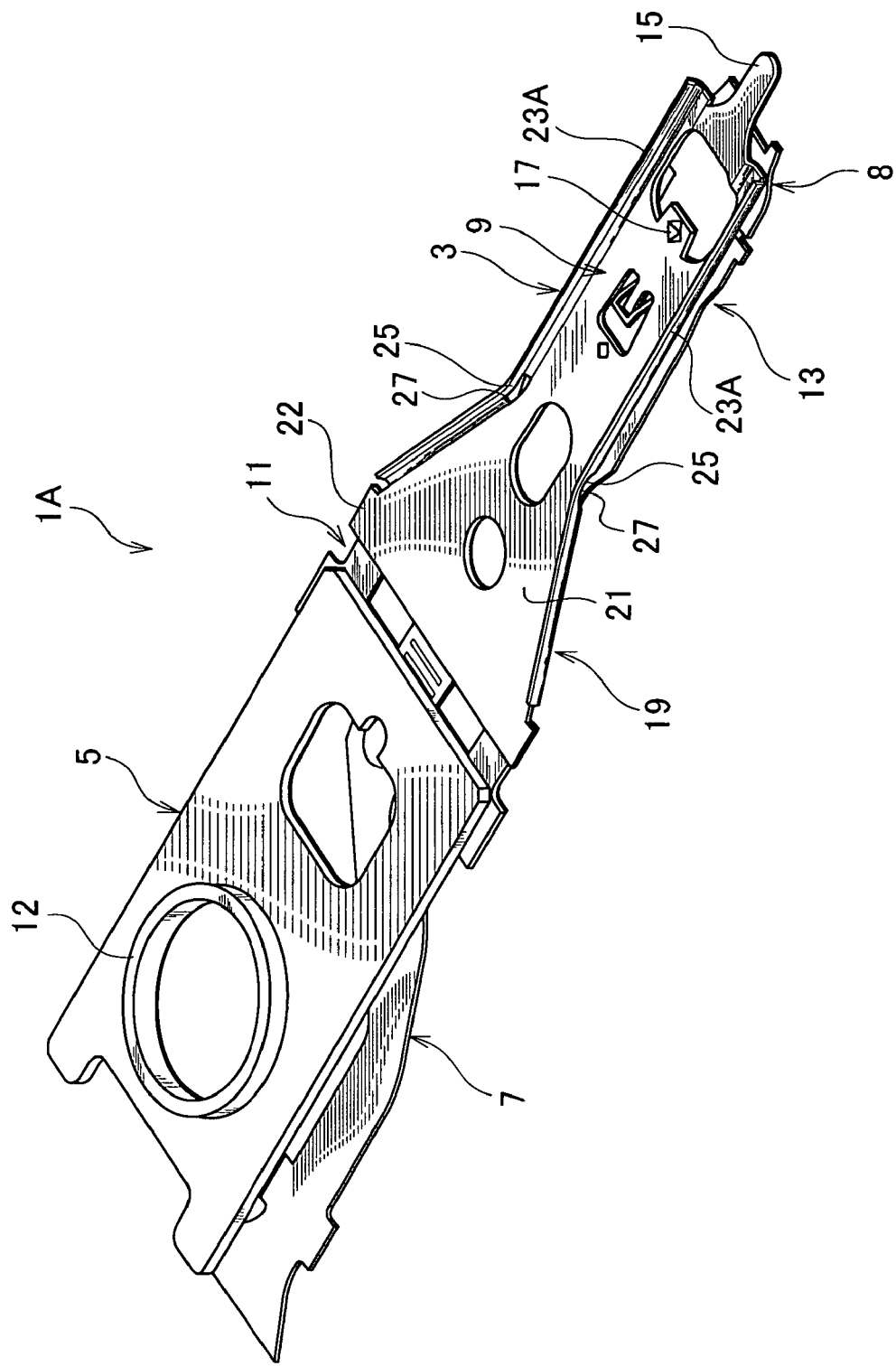
FIG. 10 is a perspective view showing a head suspension according to a second embodiment of the present invention.
Figure 11A:
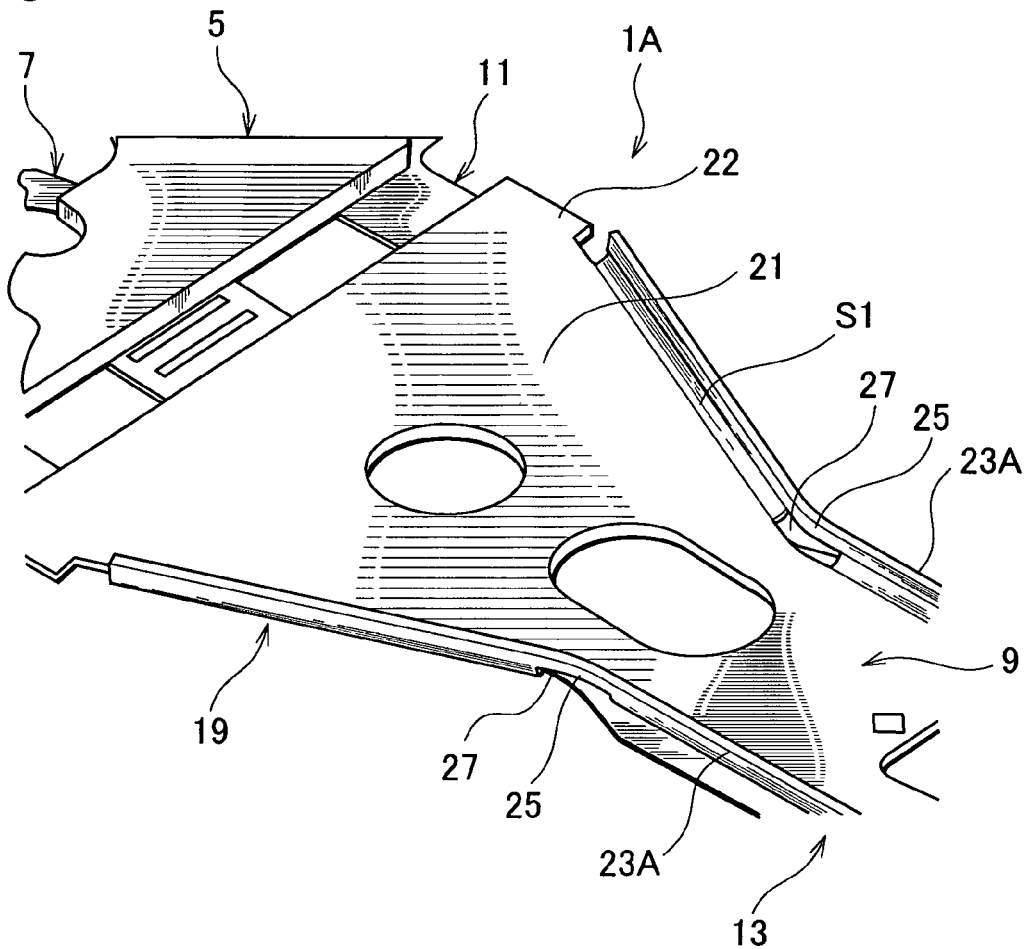
FIG. 11A is an enlarged perspective view partly showing the head suspension of the second embodiment.
Figure 11B:
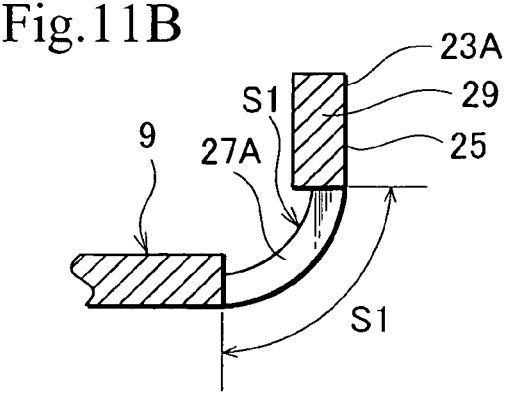
FIG. 11B is a sectional view showing a part of the head suspension of the second embodiment corresponding to the part shown in FIG. 2B.
Figure 11C:
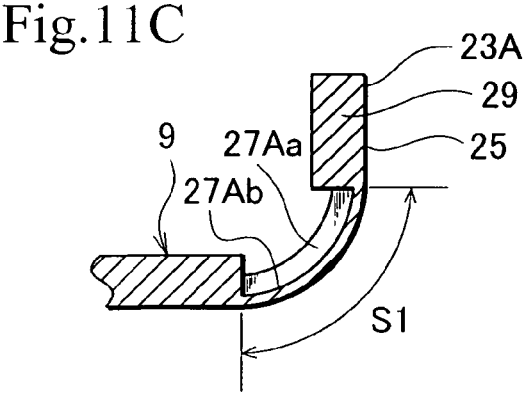
FIG. 11C is a sectional view showing a modification of the second embodiment, the part shown in FIG. 11C corresponding to the part shown in FIG. 11B.
Figure 12:
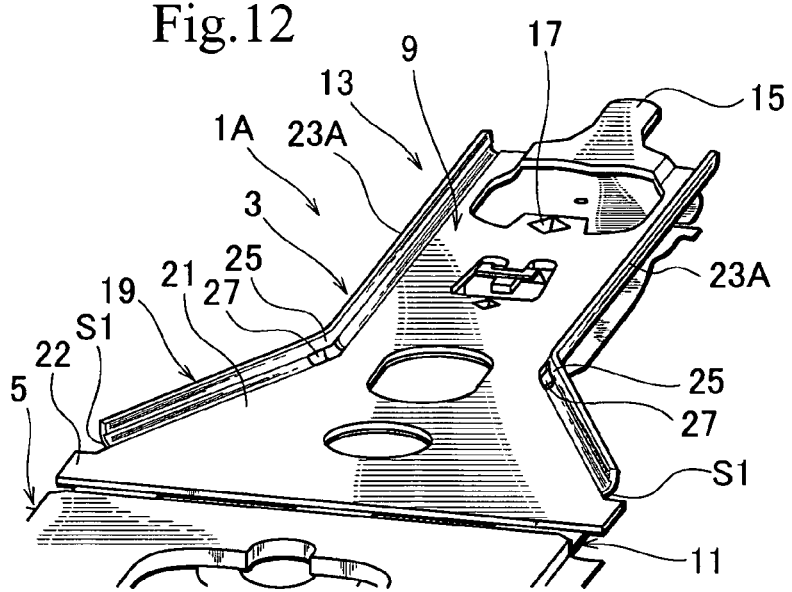
FIG. 12 is a different view showing the head suspension of the second embodiment.

A head suspension according to a second embodiment of the present invention will be explained with reference to FIGS. 10 to 12 in which FIG. 10 is a perspective view showing the head suspension, FIG. 11A is an enlarged perspective view partly showing the head suspension, FIG. 11B is a sectional view showing a part of the head suspension corresponding to the part shown in FIG. 2B, FIG. 11C is a sectional view showing a modification of the second embodiment, the part shown in FIG. 11C corresponding to the part shown in FIG. 11B, and FIG. 12 is a different view showing the head suspension of the second embodiment. Parts of the second embodiment that are the same as those of the first embodiment are represented with the same reference numerals or the same reference numerals plus "A."

The head suspension 1A according to the second embodiment is thicker than that of the first embodiment. A rigid part 9 of the head suspension 1A has a thickness of, for example, about 51 μm.

A rail 23A is formed along each side edge of the rigid part 9, and there is a vertical curve S1 between the rigid part 9 and the rail 23A. The vertical curve S1 is oriented in a rising direction of the rail 23A. According to the second embodiment, the vertical curve S1 is thinner than the rigid part 9 adjacent to the vertical curve S1 in a direction intersect with a rail extending direction. The thinner vertical curve S1 is formed by, for example, half-etching.

A rectangular window 27A, i.e., a through hole serving as a deformable part is formed at a longitudinal curve 25 in an area similar to that of the first embodiment.

The deformable part may be configured as shown in FIG. 11C. In FIG. 11C, the deformable part at the longitudinal curve 25 includes a recess 27Aa and a thin part 27Ab defined by the recess 27Aa. The area of the recess 27Aa and thin part 27Ab may be equal to that of the window 27A. The thin part 27Ab may be located at an inner, outer, or intermediate position in the thickness direction of the vertical curve S1.

Thinning the vertical curve S1 enables the rail 23A to be formed even from the thick rigid part 9 of the head suspension 1A.

Figure 13A:
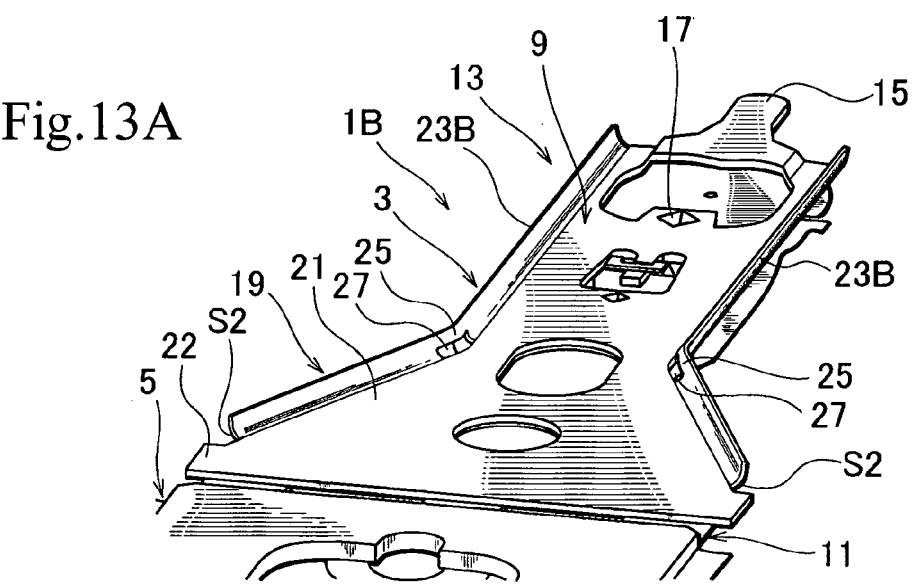
FIG. 13A is an enlarged perspective view partly showing a head suspension according to a third embodiment of the present invention.
Figure 13B:
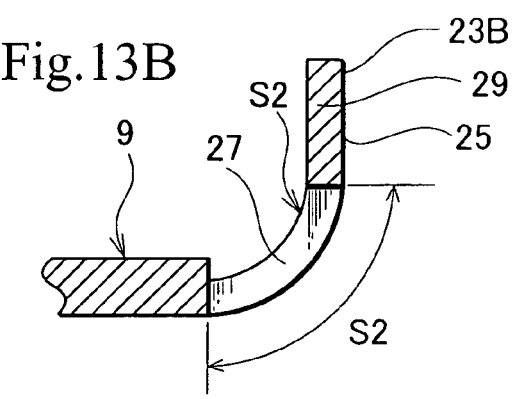
FIG. 13B is a sectional view showing a part of the head suspension of the third embodiment corresponding to the part shown in FIG. 2B.
Figure 13C:
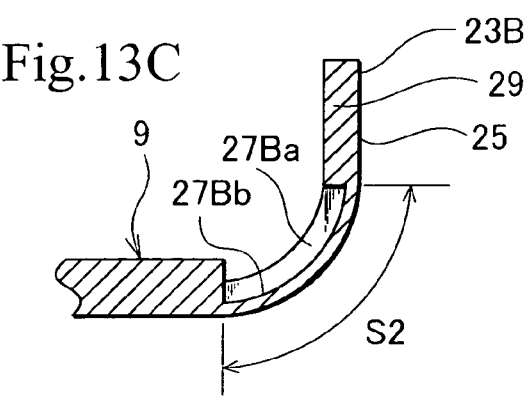
FIG. 13C is a sectional view showing a modification of the third embodiment, the part shown in FIG. 13C corresponding to the part shown in FIG. 13B.
Figure 14:
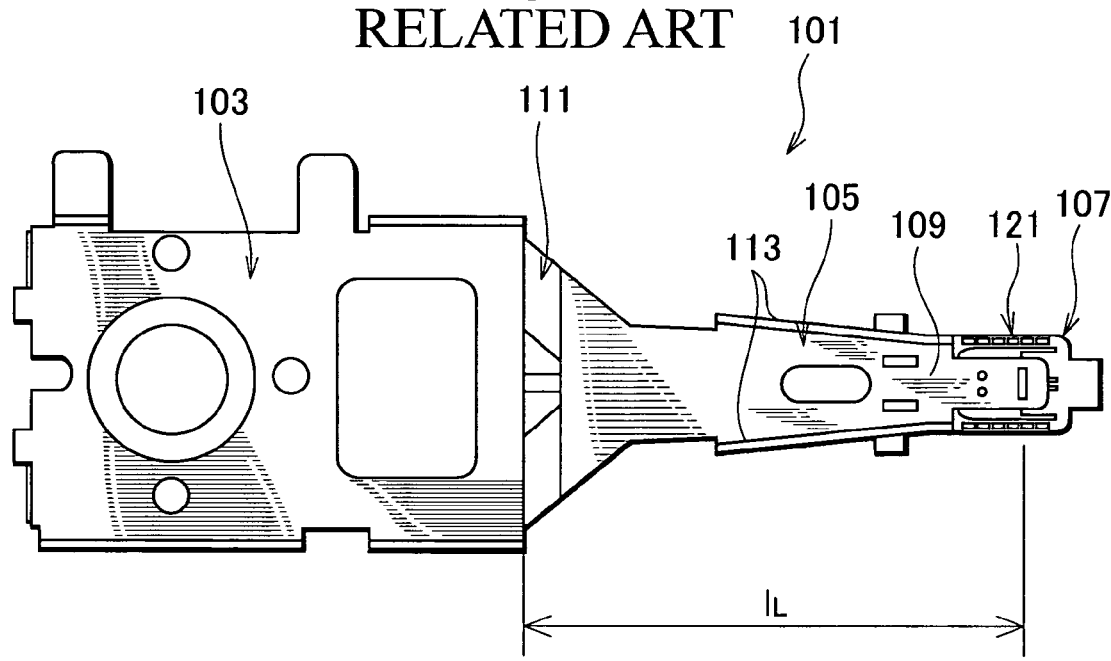
FIG. 14 is a plan view showing a head suspension according to a related art.
Figure 15:
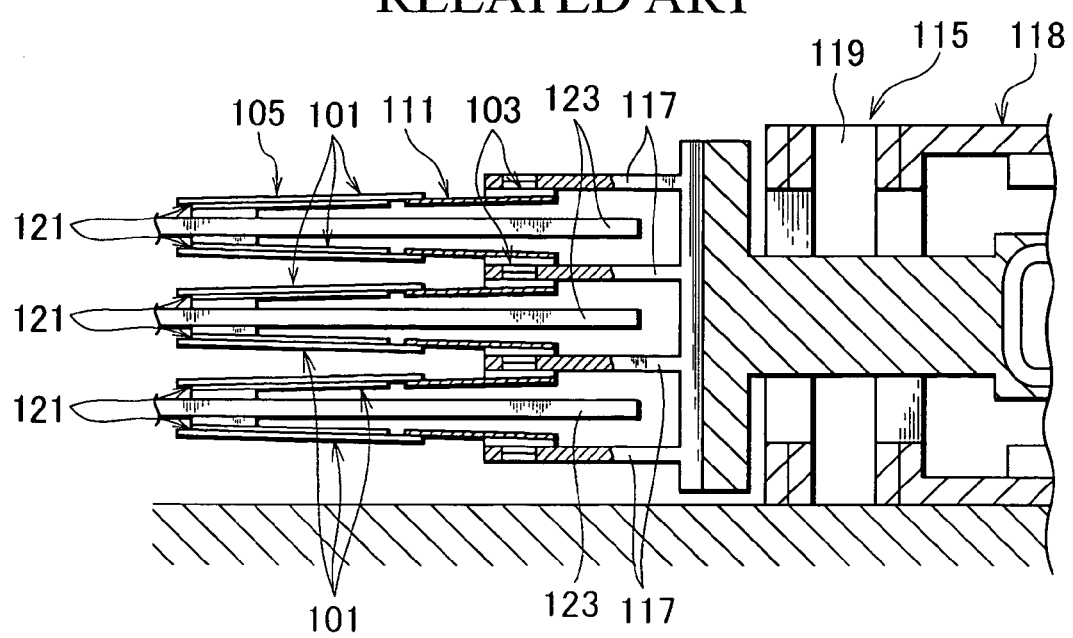
FIG. 15 is a partly sectioned view showing a hard disk drive in which the head suspension of the related art of FIG. 14 is installed.
Figure 16:
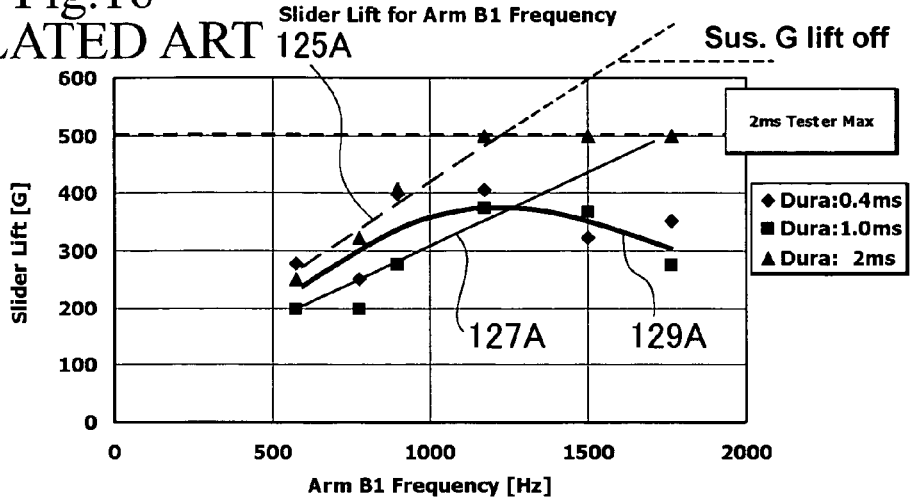
FIGS. 16 to 18 are graphs showing relationships between the B1 frequency of an arm and the action of the arm in a 2.5-inch disk drive according to a related art.
Figure 17:
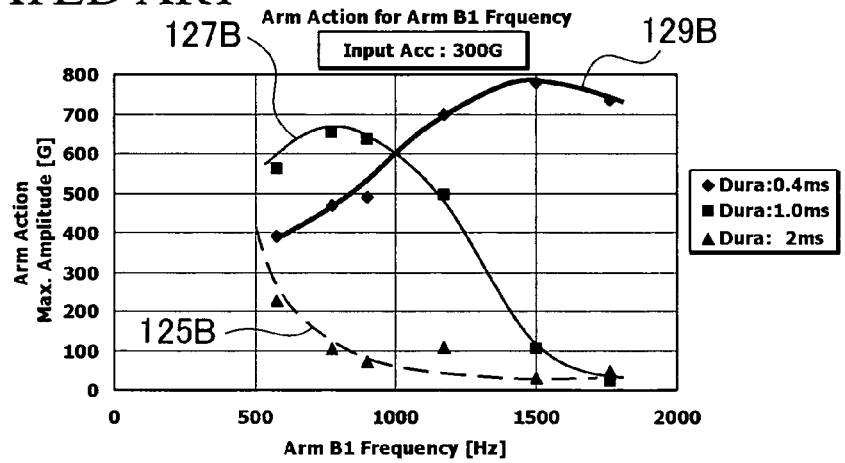
Figure 18:
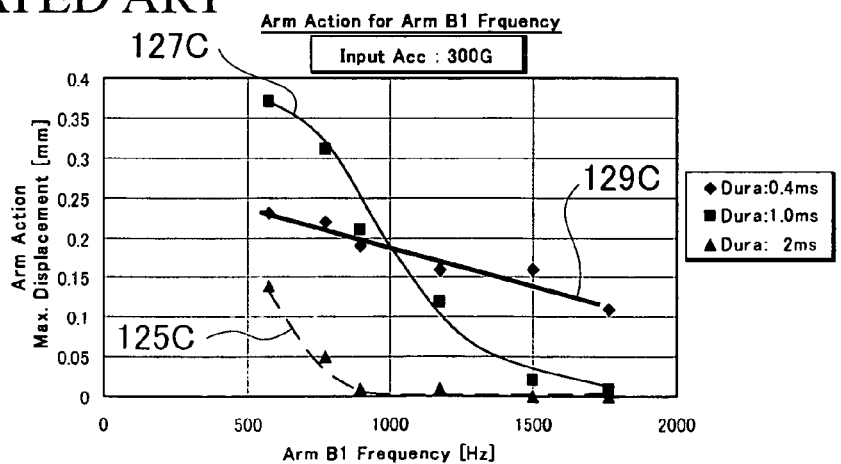

A head suspension according to a third embodiment of the present invention will be explained with reference to FIGS. 13A to 13C in which FIG. 13A is an enlarged perspective view partly showing the head suspension, FIG. 13B is a sectional view showing a part of the head suspension corresponding to the part shown in FIG. 2B, and FIG. 13C is a sectional view showing a modification of the third embodiment, the part shown in FIG. 13C corresponding to the part shown in FIG. 13B. Parts of the third embodiment that are the same as those of the first embodiment are represented with the same reference numerals or the same reference numerals plus "B."

The head suspension 1B according to the third embodiment is thicker than those of the embodiments 1 and 2. A rigid part 9 of the head suspension 1B has a thickness of, for example, 64 μm or greater.

A rail 23B is formed along each side edge of the rigid part 9, and there is a vertical curve S2 between the rigid part 9 and the rail. 23B. The vertical curve S2 is oriented in a rising direction of the rail 23B. According to the third embodiment, the rail 23B and vertical curve S2 are entirely thinner than the rigid part 9 adjacent to the vertical curve S2 in a direction intersect with a rail extending direction. The thinner parts are formed by, for example, half-etching.

A rectangular window 27B, i.e., a through hole serving as a deformable part is formed at a longitudinal curve 25 in an area similar to that of the first embodiment.

The deformable part may be configured as shown in FIG. 13C. In FIG. 13C, the deformable part at the longitudinal curve 25 includes a recess 27Ba and a thin part 27Bb defined by the recess 27Ba. The area of the recess 27Ba and thin part 27Bb may be equal to that of the window 27B. The thin part 27Bb may be located at an inner, outer, or intermediate position in the thickness direction of the vertical curve S2.

Thinning the rail 23B including the vertical curve S2 enables the rail 23B to be formed even from the thick rigid part 9 having a thickness of 64 μm (76 μm, 100 μm, or the like).

According to the present invention, the deformable part (window 27) can be formed at any longitudinal curve of a rail (23, 23A, 23B) formed on a rigid part of a head suspension. Namely, the deformable part can be formed not only at the longitudinal curve 25 adjacent to the wide part 21 of the rigid part 9 but also at any longitudinal curve on the rail.

The deformable part (27) may have any shape (elliptic, rhombic, and the like) and any size if the shape and size can effectively prevent a deformation of the head suspension when forming the rail 23 (23A, 23B) from the rigid part 9.

What is claimed is:

1. A head suspension for a hard disk drive, comprising:
a base to be attached to a carriage of the hard disk drive and turned around a spindle of the carriage;
a load beam having:
a rigid part having a front end and a base end wherein the rigid part extends in a longitudinal direction thereof from the base end to the front end, said rigid part having sides edges opposing one another in a lateral direction of the rigid part which is orthogonal to the longitudinal direction, said rigid part having a planar upper surface extending between said side edges and in a first plane defined by said longitudinal direction and said lateral direction, and said rigid part having a thickness direction normal to the planar upper surface;
a resilient part connecting the base end of the rigid part and the base;
said rigid part having a base end portion and a front end portion connected together at a junction portion, said base end portion having a width in the lateral direction which increases with increasing distance from the junction portion toward said resilient part such that portions of said side edges along the base end portion form an incline angle in said first plane of said upper surface with respect to portions of said side edges along said front end portion so as to form inflections at said junction portion; and
a head for writing and reading data to and from a disk arranged in the hard disk drive, the head being arranged at the front end of the rigid part and receiving a load from the load beam;
a flexure attached to the load beam, supporting the head, and having read/write wires connected to the head;
rails formed by bending side edge portions of the rigid part along the side edges, each or said rails being formed so as to curve plate material of the rigid part upward such that the rail rises in said thickness direction of the rigid part and defines an upward curve in a second plane normal to said first plane of said upper surface, said rail having an upper rail edge portion extending continuous from the front end portion to the base end portion of the rigid part so as to form a longitudinally curved section of rail along said inflection at said junction portion so as to define a curve in a third plane parallel to said first plane defined by said upper surface; and
a deformable part formed in each of said longitudinally curved sections of the rails, the deformable part being configured more easily deformable in longitudinal and vertical directions of the rail than other parts of said rail outside of said longitudinally curved sections, wherein deformation of said deformable part in said vertical direction corresponds to a displacement of said plate material normal to and out of said first plane during said bending and the deformation in said the longitudinal direction of the rail corresponds to relative displacement of portions of said plate material in a direction parallel to said first plane defined by said upper surface and extending along a length of said rail substantially in said longitudinal direction.

2. The head suspension of claim 1, wherein the deformable part is formed by a through hole formed in the longitudinally curved section of the rail.

3. The head suspension of claim 2, wherein the deformable part extends for an area defined by longitudinal and vertical dimensions of the longitudinally curved section.

4. The head suspension of claim 3, wherein said rail includes a part that is along the side edge of the rigid part and is bent when forming the rail that is thinner than the rigid part.

5. The head suspension of claim 3, wherein said rail includes the upper rail edge portion and a part that is along the side edge and is bent when forming the rail that are each thinner than the rigid part.

6. The head suspension of claim 2, wherein said rail includes a part that is along the side edge of the rigid part and is bent when forming the rail that is thinner than the rigid part.

7. The head suspension of claim 2, wherein said rail includes the upper rail edge portion and a part that is along the side edge and is bent when forming the rail that are each thinner than the rigid part.

8. The head suspension of claim 1, wherein the deformable part includes a recess and a thin part formed in the longitudinally curved section of the rail.

9. The head suspension of claim 8, wherein the deformable part extends for an area defined by longitudinal and vertical dimensions of the longitudinally curved section.

10. The head suspension of claim 9, wherein said rail includes the upper rail edge portion and a part that is along the side edge and is bent when forming the rail that are each thinner than the rigid part.

11. The head suspension of claim 9, wherein a part that is along the side edge of the rigid part and is bent when forming the rail is thinner than the rigid part.

12. The head suspension of claim 8, wherein said rail includes a part that is along tire side edge of the rigid part and is bent when forming the rail that is thinner than the rigid part.

13. The head suspension of claim 8, wherein said rail includes the upper rail edge portion and a part that is along the side edge and is bent when forming the rail that are each thinner than the rigid part.

14. The head suspension of claim 1, wherein the deformable part extends for an area defined by longitudinal and vertical dimensions of the longitudinally curved section.

15. The head suspension of claim 14, wherein said rail includes a part that is along the side edge of the rigid part and is bent when forming the rail that is thinner than the rigid part.

16. The head suspension of claim 14, wherein said rail includes the upper rail edge portion and a part that is along the side edge and is bent when forming the rail that are each thinner than the rigid part.

17. The head suspension of claim 1, wherein said rail includes a part that is along the side edge of the rigid part and is bent when forming the rail that is thinner than the rigid part.

18. The head suspension of claim 1, wherein said rail includes the upper rail edge portion and a part that is along the side edge and is bent when forming the rail that are each thinner than the rigid part.

* * * * *